United States Patent
Chen

(10) Patent No.: US 6,666,971 B2
(45) Date of Patent: Dec. 23, 2003

(54) METHOD FOR UTILIZING REGENERATED WASTE FROM WATER SOFTENERS USED FOR STEAM FLOOD OPERATIONS

(75) Inventor: James C. T. Chen, Houston, TX (US)

(73) Assignee: Petreco International Inc., Houston, TX (US)

(*) Notice: Subject to any disclaimer, the term of this patent is extended or adjusted under 35 U.S.C. 154(b) by 0 days.

(21) Appl. No.: 10/202,527

(22) Filed: Jul. 24, 2002

(65) Prior Publication Data

US 2002/0179533 A1 Dec. 5, 2002

Related U.S. Application Data

(63) Continuation-in-part of application No. 09/538,166, filed on Mar. 30, 2000, now abandoned, which is a continuation-in-part of application No. 09/285,571, filed on Apr. 2, 1999, now abandoned.

(51) Int. Cl.[7] .................................................. C02F 1/42
(52) U.S. Cl. ....................................................... 210/687
(58) Field of Search ........................................... 210/687

(56) References Cited

U.S. PATENT DOCUMENTS

| | | | |
|---|---|---|---|
| 3,637,015 A | 1/1972 | Holm | 166/273 |
| 3,933,631 A | 1/1976 | Adams | 210/34 |
| 3,977,968 A | 8/1976 | Odland | 210/32 |
| 4,233,158 A | 11/1980 | Wachsmuth | 210/283 |
| 4,405,463 A | 9/1983 | Jost et al. | 210/712 |
| 5,082,492 A | 1/1992 | Gallup et al. | 75/712 |
| 5,085,782 A | 2/1992 | Gallup et al. | 210/696 |
| 5,132,025 A | 7/1992 | Hays | 210/758 |
| 5,145,515 A | 9/1992 | Gallup et al. | 75/712 |
| 5,352,362 A | 10/1994 | Mizutani et al. | 210/650 |
| 5,464,530 A | 11/1995 | Stivers | 210/141 |
| 5,637,228 A | 6/1997 | Becnel, Jr. et al. | 210/702 |
| 5,690,820 A | 11/1997 | Becnel, Jr. et al. | 210/170 |

OTHER PUBLICATIONS

Samuel B. Applebaum; *Demineralization by Ion Exchange in Water Treatment and Chemical Processing of Other Liquids*, Academic Press, p. 152.

James C.T. Chen; *Some Experience in Softening the Oilfield Waters by Ion Exchange for Steamflood Operation*, pp. 225–237, 11 Figs., 7 Tables.

NSF International; *Chapter 3 EPA/NSF ETV Equipment Verification Testing Plan Nitrate Contaminant Removal by Ion Exchange*, Jul. 28, 2000, pp. 3.1 to 3.50.

James C. T. Chen et al.; *Cost Effective Treatments of Oil Field Produced Wastewater for "Wet Stream" Generation—A Case History*, Proceedings of the 39th Industrial Waste Conference, May 8–10, 1984, Purdue University, pp. 15–21.

James C. T. Chen; *Methods for Rapid Prediction of Salt Quality and Influent–Water Quality Effects on Hardness Leakage in Steamflood Water*, Journal of Petroleum Technology, pp. 793–796.

Primary Examiner—Chester T. Barry
(74) Attorney, Agent, or Firm—Madan, Mossman & Sriram, P.C.

(57) ABSTRACT

The present invention provides a method of treating the waste brine generated by the regeneration step in a water softener system and for recovering the treated waste brine so that it can be utilized as the regeneration feed for the water softener regeneration step thereby, requiring substantially lesser amounts of fresh salt.

11 Claims, 8 Drawing Sheets

METHOD FOR UTILIZING REGENERATED WASTE FROM WATER SOFTENERS USED FOR STEAM FLOOD OPERATIONS

CROSS REFERENCE TO RELATED INVENTIONS

This application is a continuation in part of application Ser. No. 09/538,166 filed Mar. 30, 2000 now abandoned; which is a continuation in part of application Ser. No. 09/285,571, filed on Apr. 02, 1999, now abandoned.

BACKGROUND OF THE INVENTION

1. Field of the Invention

This invention relates generally to softening oilfield-produced water for steam flood operations and more particularly to treating waste brine generated by the regeneration step in a water softener system to obtain brine that can be utilized as the regeneration feed for the water softener step.

2. Background of Prior Art

Steam is often injected into subsurface formations, usually through injection wells, to recover heavy oil (oil with high viscosity), to reduce the viscosity so that oil will flow from injection well to the production well. Oilfield-produced water is the common source of available water in the oilfields and is thus utilized to generate steam at the surface, which is injected into one or more injection wells drilled into the subsurface formation. The steam reduces the viscosity of the heavy oil, causing it to flow to the one or more production wells in the oilfield.

Oilfield-produced water contains high levels of total dissolved solids ("TDS"). For example the TDS level of water from the Duri Field is about 4000 ppm and that from the Bakersfield, Calif. field is about 10,000 ppm, which is primarily due to the presence of high concentrations of calcium carbonate ($CaCO_3$) and sodium chloride (NaCl).

However, commercially used steam generators require feed water with one (1) ppm hardness as $CaCO_3$. To achieve such low hardness, two-stage water softeners are usually utilized for treating the oilfield-produced water. Such water softeners contain a primary softener followed by a secondary softener. Each softener contains heavy concentrations of sodium chloride ("salt") in a suitable resin. These softeners are periodically regenerated. To obtain the one (1) ppm hardness leakage, counter-current regeneration with high salt loading, about 15 lbs. of salt per cubic foot of resin is typically adopted. With such high salt loading, the regeneration efficiency is very low—in the range of twenty to twenty-five percent (20–25%). The regeneration solution leaving the softener ("composite waste" or "waste brine") is discarded. However, due to the low regeneration efficiency, the regenerated waste brine contains large amounts of salt, which in the prior art methods is wasted. Accordingly these softeners require use of very large amounts of salt, the majority of which is wasted. The regenerated waste brine with its high salt content also is not environmentally friendly.

The present invention provides a method of treating the waste brine generated by the regeneration step in a water softener system, preferably at least two stages, and for recovering brine that can be utilized as regeneration feed brine, thereby requiring substantially lesser amounts of fresh salt. In the present invention, there is no need to lower the pH of the brine before passing it through one or more nano-filters to reject polyvalent ions. As a result, the pH of the recovered brine does not need adjustment before it can be used.

SUMMARY OF THE INVENTION

The present invention provides a method of recovering usable brine from waste brine produced during regeneration of a softener by passing brine comprising a first concentration of monovalent ions through a softener to replace bivalent ions in said softener with monovalent ions, said softener discharging waste brine comprising bivalent ions and a second concentration of said monovalent ions and passing said waste brine from said softener through a nano-filter to remove most of the bivalent ions from said waste brine while passing most of the monovalent ions through said nano-filter, thereby obtaining recovered brine with said second concentration of monovalent ions. There is no need to lower the pH prior to passing through the nano-filter(s). Accordingly, there is no need to readjust the pH of the recovered brine to render it useful or usable.

The present invention also provides a method of counter-current regeneration of a water softener containing bivalent ions, by passing brine containing a first concentration of monovalent ions through a water softener to replace bivalent ions with a portion of the monovalent ions, said softener discharging waste brine comprising bivalent and monovalent ions; passing the waste brine from said water softener through a nano-filter to remove most of the bivalent ions therefrom, thereby obtaining fluid comprising monovalent ions ("treated brine"); and by passing fluid obtained from said nano-filter through the water softener to further replace said bivalent ions in said water softener with monovalent ions from said treated brine to regenerate said water softener. No adjustment of pH of the brine prior to or after passing through the nano-filter(s) is needed for the present invention.

The method may further comprise treating said treated brine to obtain usable brine having ten to fifteen percent (10–15%) salt concentration. Another aspect of the present method may further comprise combining said treated brine with fresh brine prior to passing said treated brine through the water softener.

One preferred embodiment of the method may include passing the waste fluid through said nano-filter to produce a treated brine having from about one thousand (1000) to about five hundred (500) ppm of bivalent ions (such as Ca), also referred to as 'hardness'. Another feature of the inventive method may include of passing the fluid through the nano-filter may further include passing said fluid through at least two-stages of nano-filters, each said stage adapted to recover a portion of monovalent ions contained in said fluid.

Another aspect of the present invention regards a system of recovering salt from waste generated during counter-current regeneration of a water softener. This aspect of the present invention may use a source of fresh brine containing a selected concentration of salt, said fresh brine being fed to a water softener to replace bivalent ions in said softener with salt, said softener discharging waste brine containing bivalent ions and a portion of said salt; a nano-filter receiving said waste brine under pressure, said nano-filter removing the bivalent ions and passing at least a portion of said salt therethrough to provide treated brine suitable for use in the regeneration of said water softener. A further feature of this system may use a nano-filter with at least two-stages, each said stage recovering at least a portion said salt.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

The present invention provides a system and methods for treating regenerated waste brine from a counter-current regeneration process of a water softener to recover brine ("recovered brine") that is then utilized to regenerate the water softener. The regenerated water softener is utilized to soften oilfield-produced water to produce water suitable for use in at least once-through type steam generators for producing steam for re-injection into injection wells.

Figure 1:
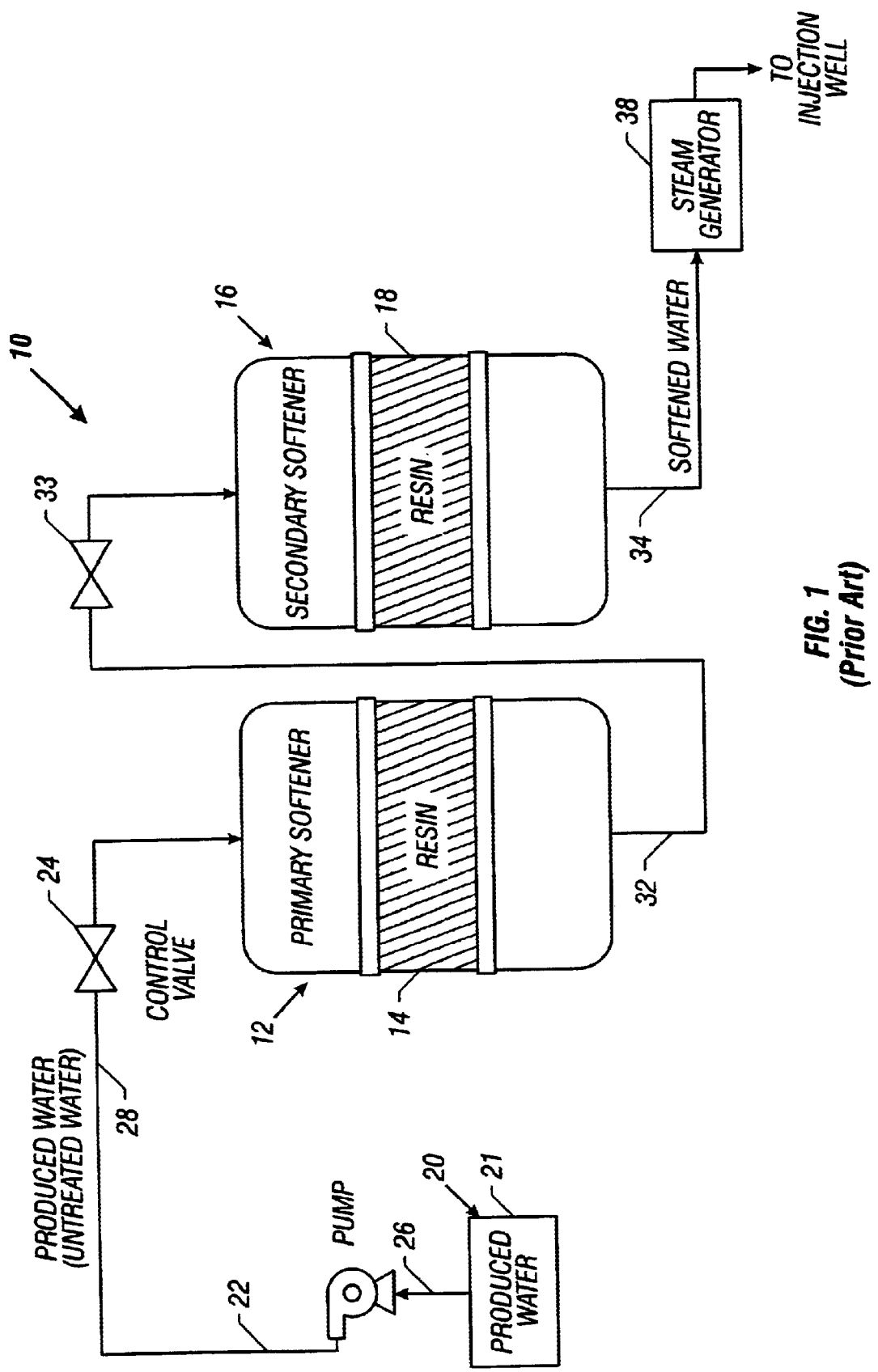
FIG. 1 (Prior Art) is a schematic diagram of two-stage zeolite water softener system for supplying softened water to a steam generator.

Steam flood operations are widely utilized to enhance production of oil from hydrocarbon-bearing subsurface formations ("reservoirs"). Oilfield-produced water is the water usually available to produce the steam in the field. Due to the high total dissolved solids (TDS) level of the oilfield-produced water and the low hardness (about 1 ppm) of water required for once through steam generators, water softening is usually accomplished by a two-stage softener containing a primary softener followed by a secondary softener in series, such as softener system 10 shown in FIG. 1. The system 10 includes a primary softener 12 with a suitable resin 14 followed by a secondary softener 16 having a suitable resin 18 containing a heavy concentration of salt containing monovalent ions. Oilfield-produced or untreated water 21 from a source 20 is pumped by a pump 22 into the primary softener 12 via lines or conduits 26 and 28. A fluid flow control valve 24 is utilized to control the flow rate of the untreated water 21 into the primary softener 12. A substantial number of bivalent ions (e.g., calcium and magnesium) in the untreated water 21 are replaced by monovalent ions (e.g., sodium) present in the resin 14, the softened water leaves the primary softener 12 via line 32. The brine leaving the primary softener 12 passes through the secondary softener 16 via line 32 and flow control valve 33. The water leaves the softener 16 via line 34 that is supplied to a suitable steam generator 38 to produce steam 40, which is injected into one or more injection wells (not shown). A control valve 33 may be utilized to control the fluid flow rate into the secondary softener 16. A two-stage softener has been found to be usually adequate to produce softened water having one (1) ppm hardness, which, as noted above, is adequate for use in once-through steam generators.

Figure 2:
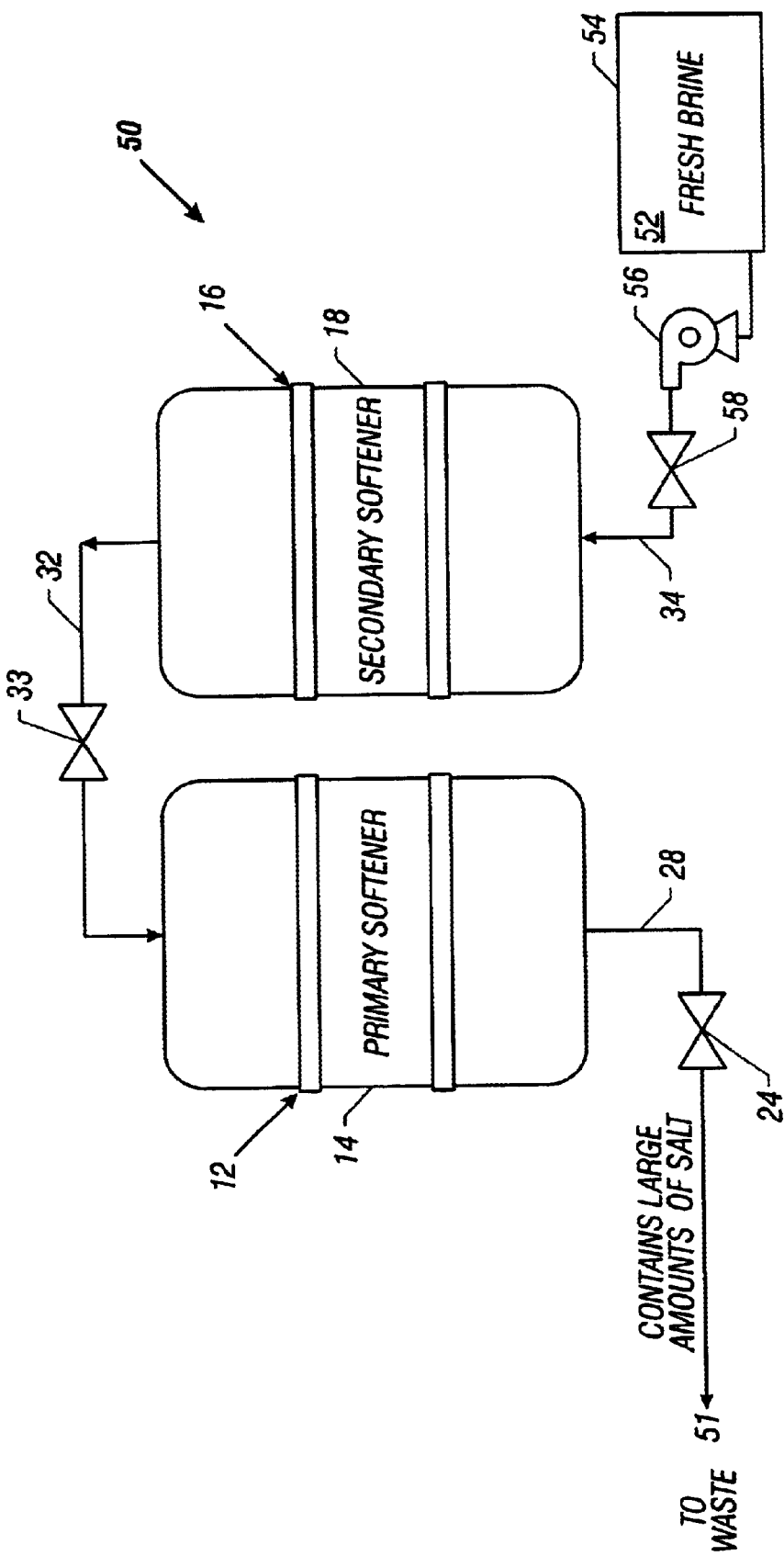
FIG. 2 (Prior Art) is a schematic diagram of a counter-current regeneration process for the two stages of the softener system shown in FIG. 1.

As the monovalent ions in the softeners 12 and 16 deplete, these softeners must be regenerated with new salt. Counter-current regeneration with a brine having high salt loading containing a high concentration of monovalent ions is required to produce low hardness softened water of one (1) ppm due to the high TDS level of the oilfield-produced water. FIG. 2 shows a countercurrent regeneration process 50a for two-stage resin softener, a system wherein common elements with FIG. 1 have been given same numbers. Fresh brine 52 usually with 10–15 percent salt concentration is pumped from a source 54 thereof into the secondary softener 16 by a pump 56 via line 34. A control valve 58 controls the flow rate of fresh brine 52 into the softener 16. The brine leaving the secondary softener 16 via line 32 and flow control valve 33 and passes through the primary softener 12 in the counter or reverse flow direction compared to the flow of the untreated water shown in FIG. 1. The fresh brine 52 regenerates both the secondary softener 16 and the primary softener 12. The fluid 51 discharging from the primary softener (the "composite waste" or "waste brine") via line 28 is discarded. A control valve 24 may be utilized to control the fluid flow rate of the discharging waste brine 51. The regeneration efficiency for such high salt loading is very low, usually in the range of 20–25 percent. The waste brine has high concentration of both bivalent ions (e.g., calcium and magnesium) and monovalent ions (e.g., sodium). The waste brine can be reused in the regeneration if the bivalent ions are removed therefrom without removing substantial amounts the monovalent ions. The present invention provides systems, processes and methods (FIGS. 3–5) for treating the waste brine to remove bivalent ions to produce a recovered brine with a relatively high concentration of monovalent ions and reusing the recovered brine in the counter-current regeneration process described above. There is no need to lower the pH of the brine before it is passed through a nano-filter to produce the recovered brine. For ease of understanding common elements are referred to by same numerals.

Figure 3:
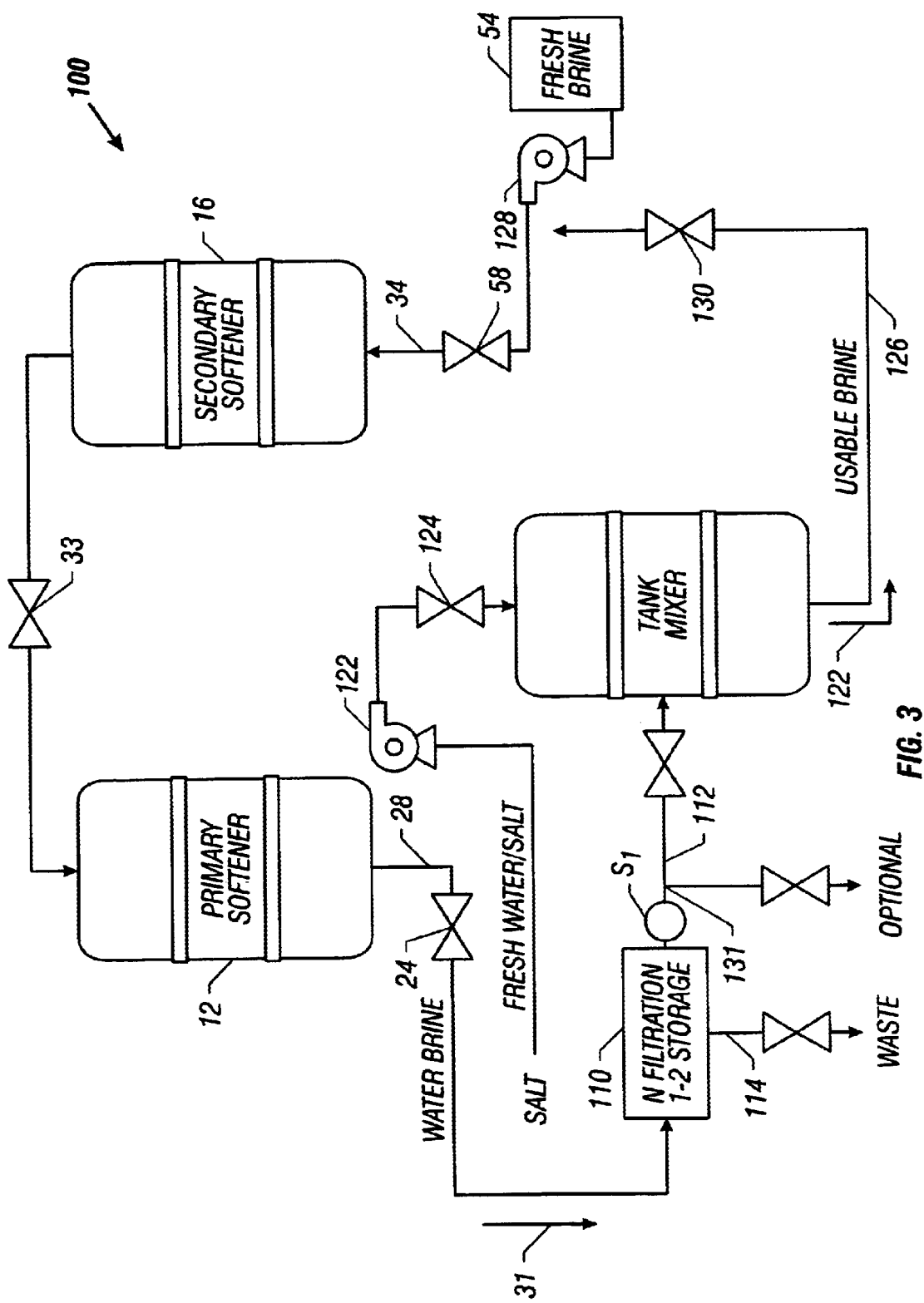
FIG. 3 is a schematic diagram of a counter-current regeneration process, wherein regenerated waste brine is treated to recover brine that is suitable for use in the counter-current regeneration process, according to one embodiment of the present invention.

FIG. 3 shows a schematic diagram of a system 100 and method for treating the waste brine 51 and utilizing the treated brine ("recovered brine") 120 for counter-current regeneration according to on embodiment of the present invention. The counter-current regeneration process shown in FIG. 2 provides waste brine 51 at line 28, which as noted-above contains high concentration of bivalent or hardness ions (calcium) and monovalent ions (sodium). In the system 100, the waste brine is passed through at least one nano-filter 110 that removes most of the bivalent ions but passes through most of the monovalent ions.

Figure 3A:
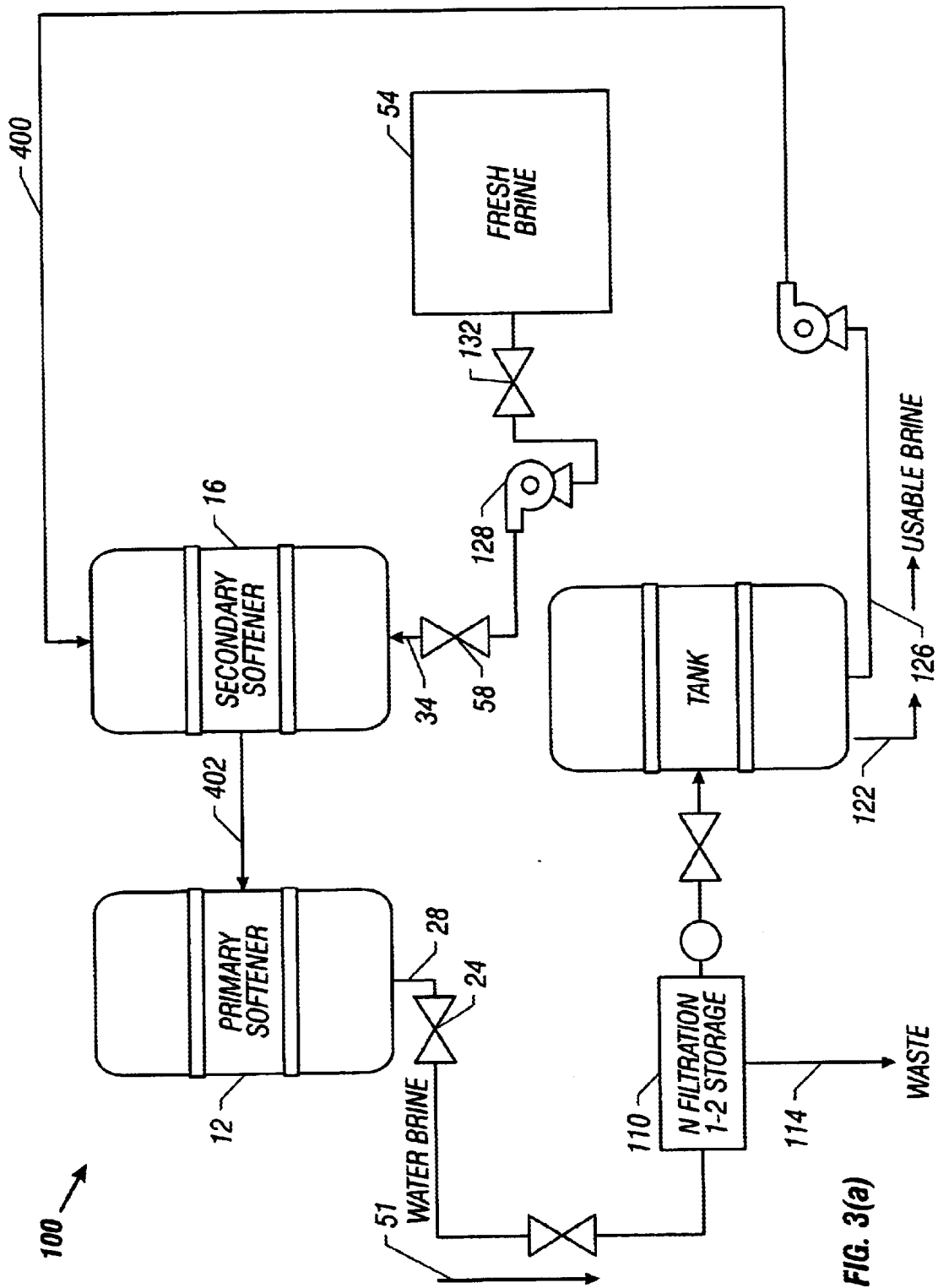
FIG. 3(a) is a schematic diagram of a process of directing usable brine obtained from nano-filtration through a pump to a secondary softener to reduce the amount of fresh brine needed for a counter-current regeneration of spent softener.

FIG. 3(a) shows a schematic diagram of a system 100 and method for treating the waste brine 51 and utilizing the treated brine ("recovered brine") 126, which is usable as stream 400 being fed directly to secondary softener 16 for counter-current regeneration according to on embodiment of the present invention. The countercurrent regeneration process shown in FIG. 2 provides waste brine 51 at line 28, which as noted-above contains high concentration of bivalent or hardness ions (calcium) and monovalent ions (sodium). In the system 100, the waste brine is passed through at least one nano-filter 110, which removes most of the bivalent ions but passes through most of the monovalent ions.

Also shown in FIG. 3(a) is an important element of the present invention, namely the use of the treated brine 126 as a blocking fluid. In the practice of the use of two stage water softeners, the bulk of the ion removal actually takes place in the primary stage with the secondary stage being used as a "polisher," that is it removes only the last 1–5 percent of the removable ions. The resins used for this process or more easily dispersed and can be lost into the primary stage of the water softener if measures to prevent this are not taken.

In the practice of the present invention, a blocking fluid is introduced into the top of the secondary stage of the water softener during countercurrent regeneration. The blocking fluid acts to prevent or at least reduce the re-suspension of the resin sufficient to prevent the resin from being flushed out of the softener. In FIG. 3(a), the treated brine 126 is introduced as a stream of same 400 into the top of the secondary stage of the softener 16 as a blocking fluid. The use of the treated brine as a blocking fluid can be done using any method and control apparatus known to be useful to those of ordinary skill in the art of regenerating two stage water softeners.

Figure 3B:
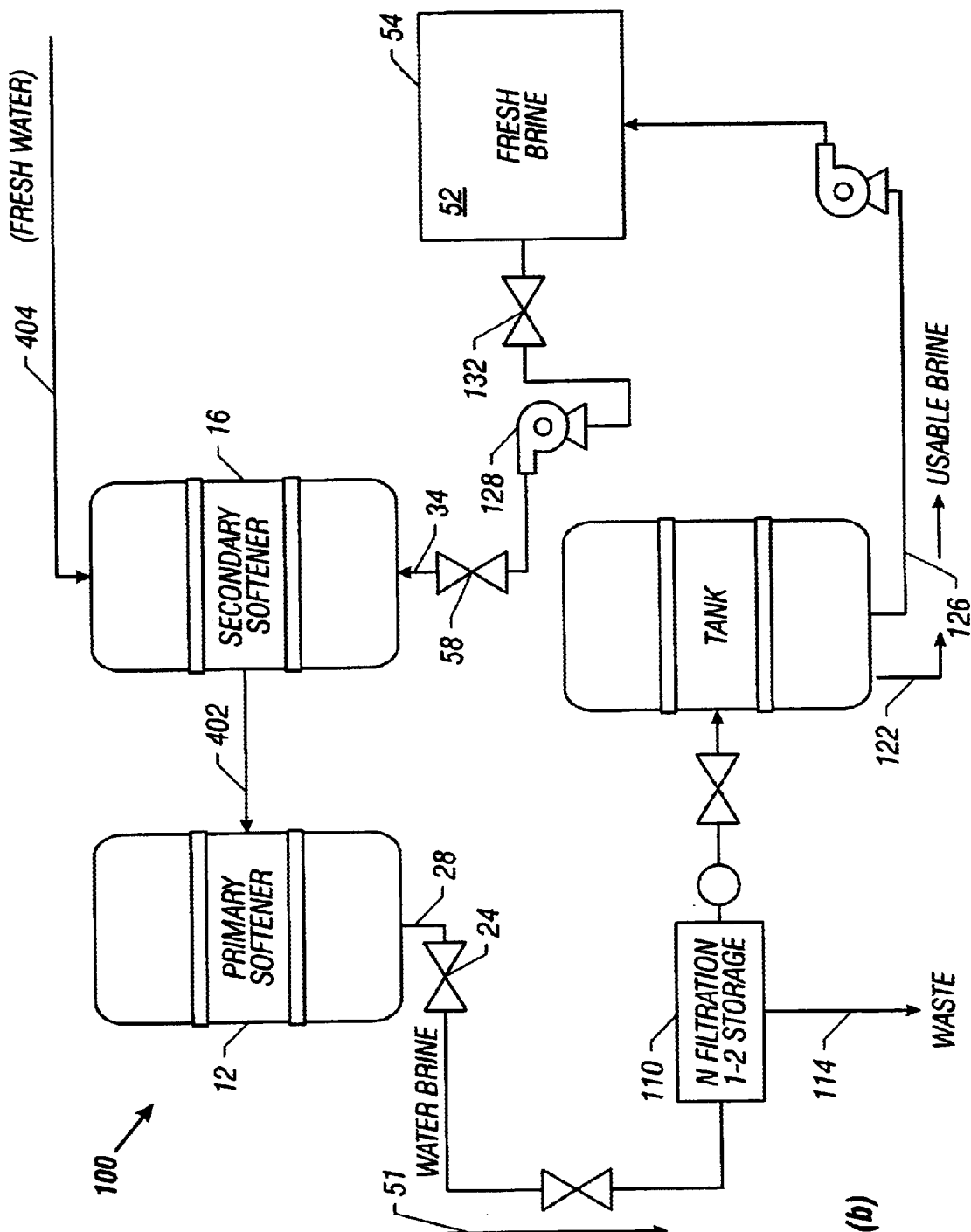
FIG. 3(b) is a schematic diagram of a process of sending usable brine, which is of sufficient salt concentration, directly to the fresh brine supply, thus reducing the amount of fresh brine or salt needed.

FIG. 3(b) shows a schematic diagram of a system 100 and method for treating the waste brine 51 and utilizing the treated brine ("recovered brine") 126, which due to its high salt concentration is added directly to fresh brine supply 54 for counter-current regeneration according to on embodiment of the present invention. The counter-current regeneration process shown in FIG. 2 provides waste brine 51 at line 28, which as noted-above contains high concentration of bivalent or hardness ions (calcium) and monovalent ions (sodium). In the system 100, the waste brine is passed through at least one nano-filter 110 that removes most of the bivalent ions but passes through most of the monovalent ions. The use of a stream of fresh water 404 as a second blocking fluid is shown. This is in addition to the use of a stream of treated brine (not shown) for the same purpose and this combination is within the scope of the claims of the present invention.

A nano-filtration process is described below in reference to FIG. 4. Here, the nano-filtration process serves the objectives of removing the hardness causing bivalent ions without removing substantial amounts of the monovalent sodium ions.

The wastewater 114 from the filtration process 110 contains a large concentration of salts and is discarded. The recovered brine leaving the nano-filter 110 is passed to a line 112 for further use or processing. Sensors $S_1$ at the output of the nano-filter 110 provide in-situ measurements of the hardness of the recovered brine and the concentration of the monovalent ions. Sample taps 131 on line 112 may also be utilized to sample and determine the various characteristics of the recovered brine at 112. As noted above, a ten to fifteen percent (10–15%) concentration of the salt is needed for the regeneration process. If the characteristics of the recovered brine at 112 do not meet the desired specifications, it may be treated further at stage 120. Fresh water and/or salt dissolved in the fresh water may be introduced at stage 120 by a pump 122 via a control valve 124. The resultant brine 121 (referred to herein as the "usable brine") discharges the treatment stage 120 via line 126 having the desired ten to fifteen percent (10–15%) concentration of salt. If the amount of the usable brine 121 from the recovered brine is not adequate, fresh brine 52 from the source 54 may be supplied to the softener 16. A pump 128 may be utilized to pump the usable brine 121 from stage 120 and fresh brine 52 via check valves 130 and 132 respectively. Alternatively, fresh brine 52 may be introduced at stage 120 to obtain brine with the required sodium ion concentration. The usable brine may then be pumped into the softeners 16 and 14 directly from the stage 120. After the completion of the regeneration process, the filters 12 and 16 are utilized to soften water with high TDS level as show in FIG. 1.

Figure 4:
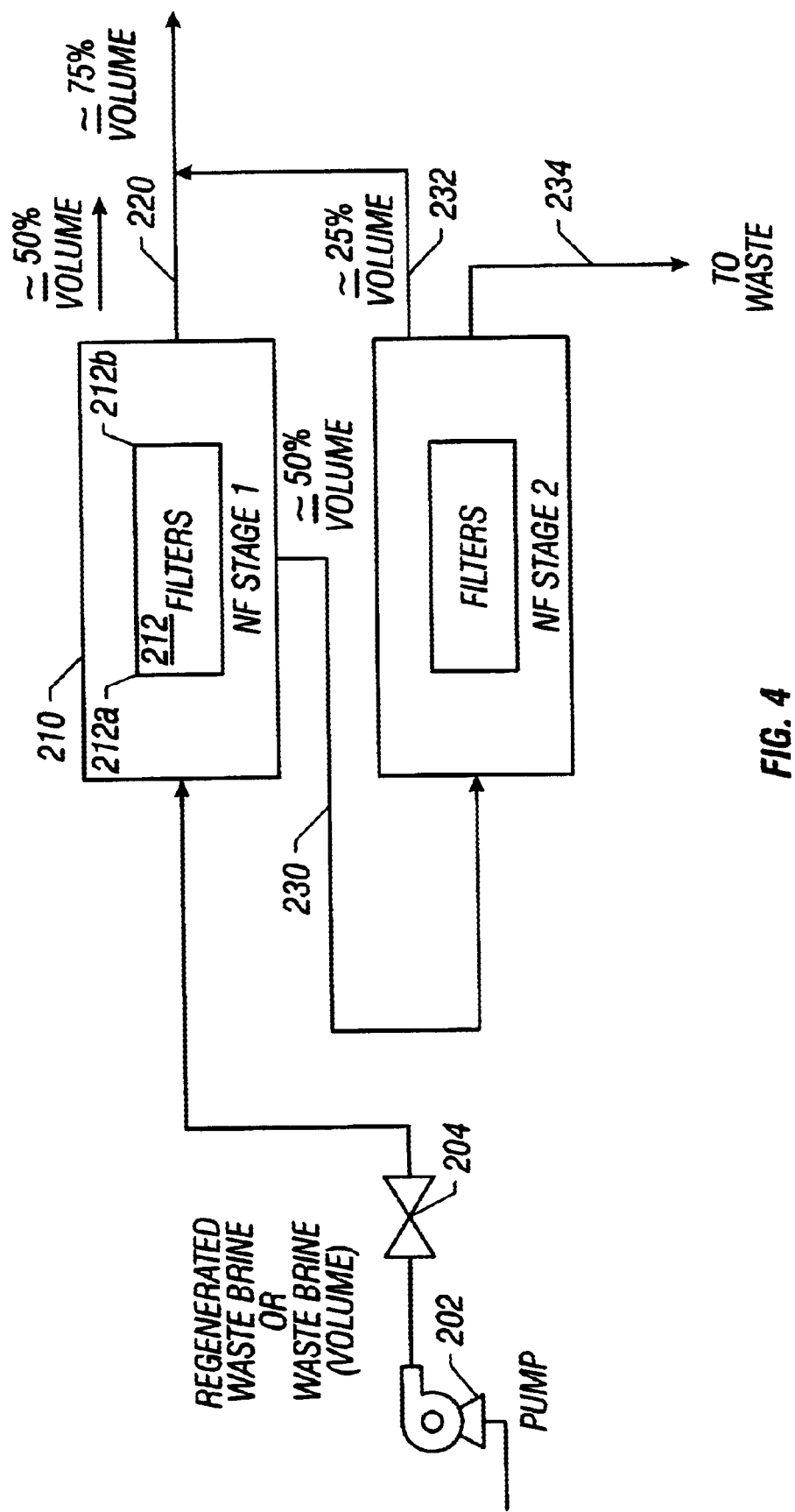
FIG. 4 is a schematic diagram of a two-stage nano-filtration process for treating regenerated waste to recover brine suitable for use in the counter-current regeneration process of FIGS. 3, 3(a) and 3(b).

FIG. 4 is a schematic diagram of a two-stage nano-filtration process 200 for treating the regenerated waste brine. A nano-filtration stage usually recovers about fifty percent (50%) of the volume. Thus, the recovery of the salt content is about fifty percent (50%) of the inlet monovalent ions. Although one nano-filtration stage may be used, additional salt can be recovered by employing more than one nano-filtration stage in series. Alternatively, nano-filtration stages may be placed in a parallel configuration for operational purposes such as maintenance. In the system 200, waste brine at 28 is pumped by a relatively high pressure pump 202 via a flow control valve 204 into the first nano-filtration stage 210.

The stage 210 includes a suitable nano-filtration membrane 212. The waste brine 28 is pumped to a feed side 212a of the stage 210 of the nano-filtration membrane 212. The membrane 212 in the filtration unit 212 prevents the passage of substantially all the hardness content caused by bivalent ions (e.g., calcium and magnesium), but allows the monovalent ions (e.g., sodium) to permeate or pass through the membrane 212. Relatively small amounts of hardness content remains in the first stage permeate 220 that are discharged at the product side 212b of the membrane 212. The waste 216 from the stage 210 may be discarded or passed through a second stage 230. Usually about fifty percent (50%) of the feed volume passes through each nano-filtration stage, such as stage 210, thereby recovering only about fifty percent (50%) of the monovalent ion salt content from the waste brine 28, or waste 216 supplied to the second stage 230, respectively.

The second stage 230, may be used to recover an additional one-half of the feed waste, i.e. about another twenty-five percent (25%) of the remaining volume. The second stage permeate 232 from the second stage 230 may be combined with first stage permeate 220 from the stage 210 and utilized for the regeneration process as described in reference to FIGS. 3, 3(a), 3(b) and 5. The waste 234 from the stage 230 is suitably disposed. Nano-filters made from composite materials may be utilized as the membranes. Any other suitable nano-filter may also be utilized. Nano-filter membranes and units are commercially available and are thus not described in greater detail herein.

Figure 5:
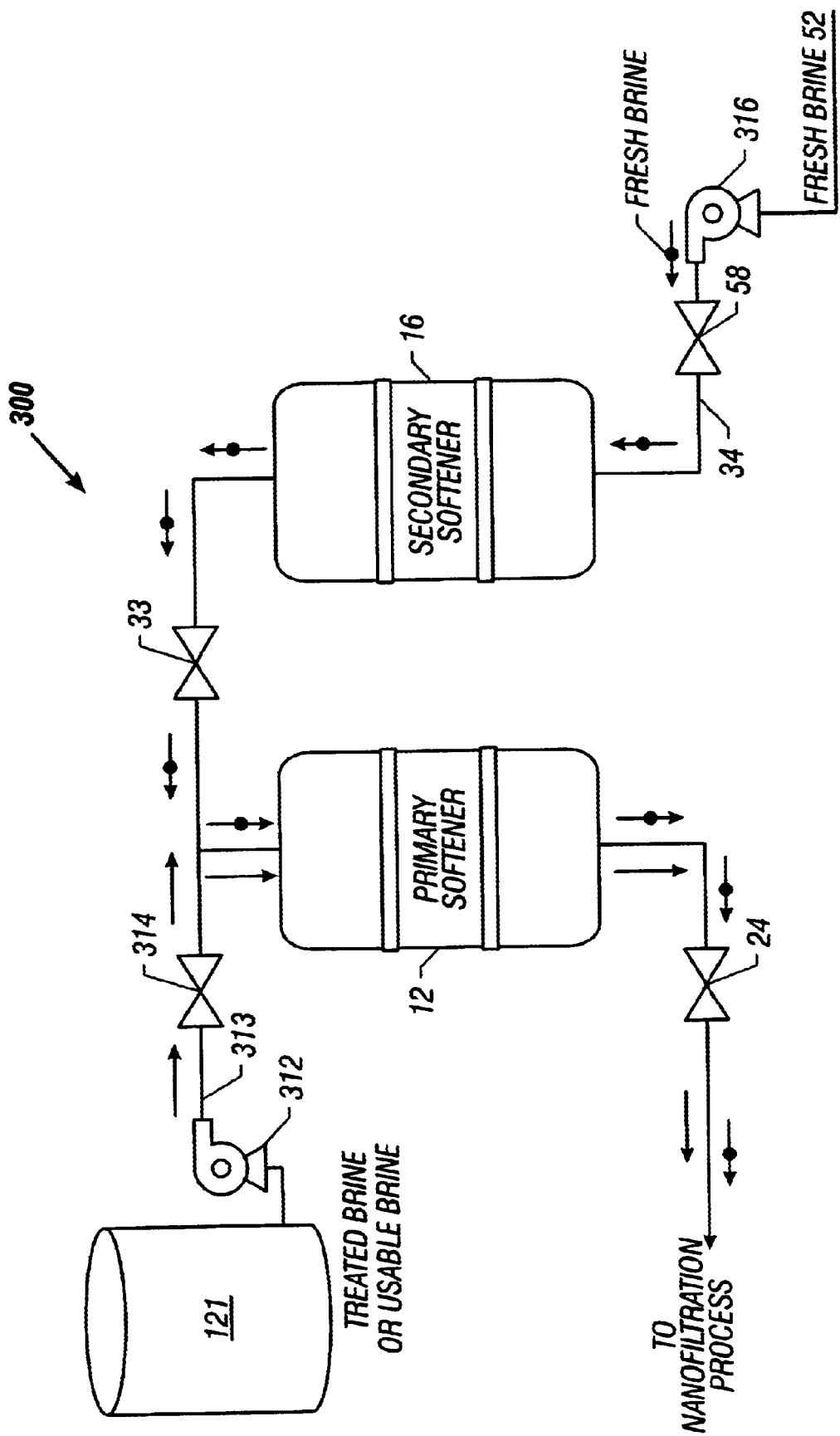
FIG. 5 is a schematic diagram of an alternative mode of operation of a counter-current regeneration process according to the present invention.

FIG. 5 is a schematic diagram of an alternative embodiment 300 of the counter-current regeneration process utilizing the usable brine 121 shown in FIG. 3. In this embodiment, the fresh brine 52 is passed through the secondary softener 16 and then through the primary softener 12 in the manner shown in FIG. 5. The usable brine 121, obtained after the nano-filtration process shown in FIG. 3, is pumped into the primary softener by a pump 312 via line 313 and fluid control valve 314. The fluid entering the primary softener 12 is a mixture of the usable brine 121 and the discharge from the secondary softener 16. The fluid leaving the primary softener 12 contains heavy concentration of the hardness ions and the salt, which is fed into the nano-filtration process, such as show in FIG. 4, to obtain useable brine that can be used to regenerate the softener 12.

Figure 6:
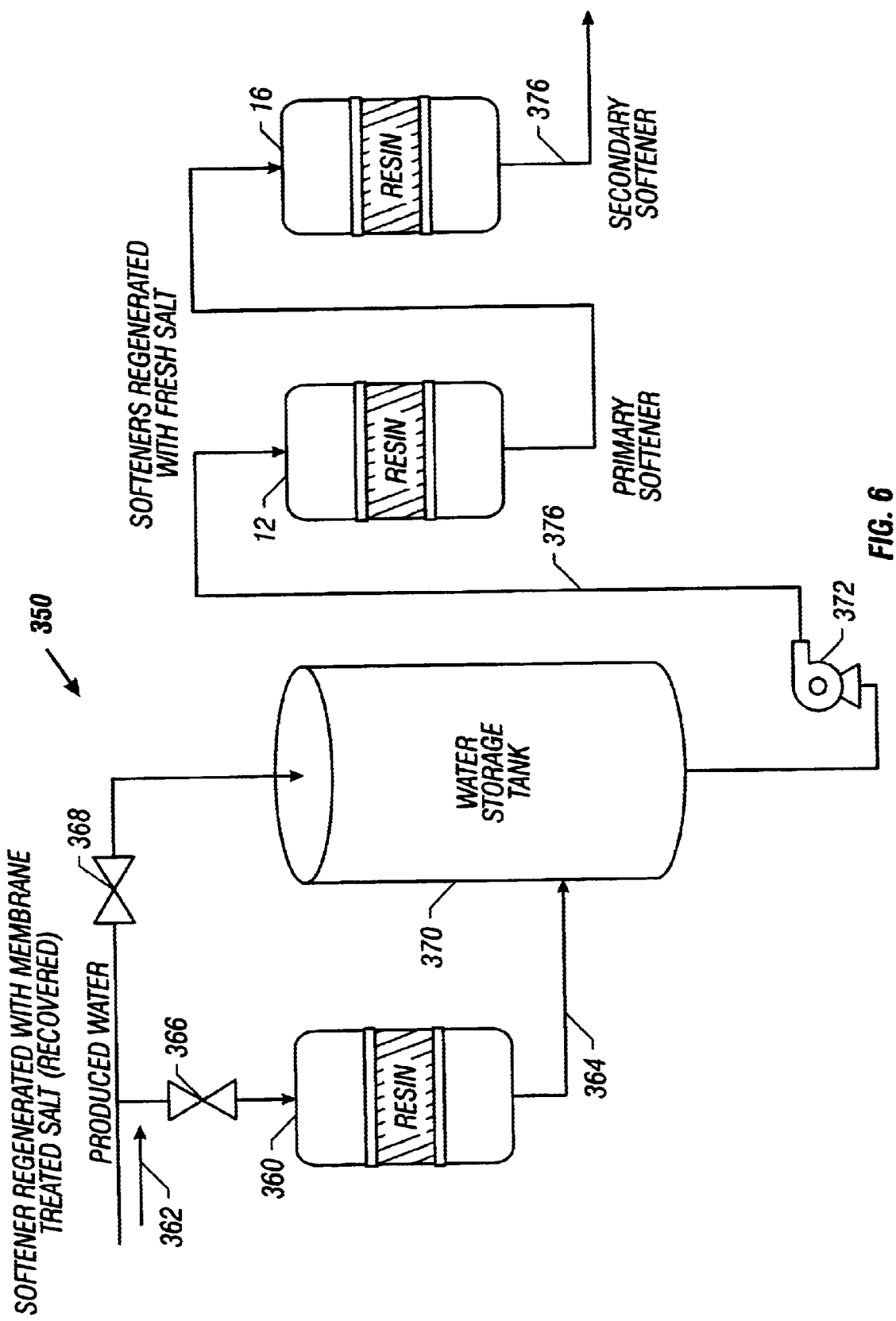
FIG. 6 is a schematic diagram of a water softening system wherein pre-softening of the produced water is done by utilizing recovered brine from the regenerated waste brine.

FIG. 6 is a schematic diagram of a water softening system 350 wherein the treated brine from the regeneration step is utilized to regenerate softeners in a pre-softening step while fresh brine is utilized to regenerate the softeners in the final state, such as the system described in FIG. 2. The system 350 includes a pre-softener 310 and a two-stage softener system containing softeners 12 and 16. In the system 350, the treated or recovered brine from the regenerated waste brine is utilized to regenerate the pre-softener 310 while fresh brine is utilized to regenerate the primary and secondary softeners 12 and 16.

Still referring to FIG. 6, the produced or untreated water 302 is passed through the pre-softener 360, which replaces a portion of the bivalent ions with the monovalent ions present in the softener 310. The water discharging the softener 360 at line 304 contains reduced concentration of hardness ions compared to the feed water 362. The amount of feed water 362 passed through the softener 360 may be controlled by a fluid flow control valve 366. The softened water at 364 and the remaining feed water is discharged into a storage tank 370. Control valve 368 may be utilized to control the flow of the produced water into the storage tank 370. The mixture 372 in the storage tank contains softer water compared to the feed water 302. The water 372 is pumped by a pump 374 into the primary softener 72 via line 376 in the manner described in reference to FIG. 2. The brine leaving the secondary softener at 378 is used to generate steam. Thus, in this system feed water is pre-softened utilizing a pre-softener that is periodically regenerated with treated brine. The pre-softened water is then passed through a softener system to obtain feed water suitable for generating steam.

Thus, the present invention provides a method of removing hardness ions from recovered brine without removing substantial amounts of the sodium ions. The treated fluid may be further processed to obtain brine that contains the desired concentration of the monovalent ions. This brine is then used, at least in part, to regenerate one or more of the softeners in the water softening system.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of treating waste brine produced during regeneration of a two-stage softener, comprising:
    a) passing brine comprising a first concentration of monovalent ions through the softener to replace bivalent ions present in the softener with the monovalent ions, the softener discharging waste brine comprising bivalent ions and a second concentration of the monovalent ions;
    b) passing the waste brine from the softener through a nano-filter to remove a portion of the bivalent ions from the waste brine while passing a portion of the monovalent ions through said nano-filter, to obtain treated brine with a third concentration of monovalent ions; and
    c) using at least a portion of the treated brine with a third concentration of monovalent ions as a blocking fluid for regeneration of the secondary stage of the two-stage softener.

2. The method of claim 1 further comprising mixing said treated brine with fresh brine to obtain feed brine having a predetermined concentration of monovalent ions in said feed brine.

3. The method of claim 2, wherein said predetermined concentration is between ten and fifteen percent (10 and 15%) by volume.

4. The method of claim 1 further comprising supplying said treated brine to the softener to replace bivalent ions in said softener with monovalent ions in said feed brine.

5. The method of claim 4 further comprising mixing fresh brine with said feed brine.

6. The method of claim 1 further comprising treating the waste brine without lowering the pH of the waste brine.

7. A method of regeneration of a two stage water softener containing bivalent ions, comprising:
    a) passing brine containing a first concentration of monovalent ions through a water softener to replace bivalent ions in the water softener with a portion of the monovalent ions, said softener discharging waste brine comprising bivalent and monovalent ions;
    b) passing the waste brine from said water softener through a nano-filter to remove bivalent ions therefrom, thereby obtaining fluid comprising monovalent ions ("treated brine");
    c) passing the treated brine through the water softener to further replace said bivalent ions in said water softener with monovalent ions from said treated brine to regenerate said water softener; and
    d) using at least a portion of said treated brine as a blocking fluid for regeneration of the secondary stage of the two-stage softener.

8. The method of claim 7 further comprising treating said treated brine to obtain usable brine having ten to fifteen percent (10–15%) salt concentration.

9. The method of claim 7 further comprising combining said treated brine with fresh brine prior to passing said treated brine through the water softener.

10. The method of claim 7, wherein passing the waste fluid through said nano-filter produces treated brine having from about one thousand (1,000) to about five hundred (500) ppm of bivalent ions.

11. The method of claim 7, wherein passing said fluid through the nano-filter includes passing said fluid through at least two-stages of nano-filters, each said stage adapted to recover a portion of monovalent ions contained in said fluid.

* * * * *